(12) United States Patent
Jangam et al.

(10) Patent No.: US 11,956,126 B1
(45) Date of Patent: Apr. 9, 2024

(54) ENHANCING CONTAINER WORKLOAD VISIBILITY IN DATA CENTER ENVIRONMENTS WITH BLADE SWITCHES

(71) Applicant: Cisco Technology, Inc., San Jose, CA (US)

(72) Inventors: Anil Bhikuayya Jangam, Milpitas, CA (US); Deepika Sharma, San Jose, CA (US); Shyam Nayan Kapadia, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/104,446

(22) Filed: Feb. 1, 2023

(51) Int. Cl.
 *G06F 15/173* (2006.01)
 *H04L 41/122* (2022.01)
 *H04L 41/22* (2022.01)

(52) U.S. Cl.
 CPC ............ *H04L 41/122* (2022.05); *H04L 41/22* (2013.01)

(58) Field of Classification Search
 CPC .............................. H04L 41/122; H04L 41/22
 See application file for complete search history.

(56) References Cited

U.S. PATENT DOCUMENTS

| | | | |
|---|---|---|---|
| 9,690,611 B2 | 6/2017 | Jacobs et al. | |
| 10,671,571 B2 | 6/2020 | Wells | |
| 10,791,168 B1 | 9/2020 | Dilley et al. | |
| 2010/0103837 A1* | 4/2010 | Jungck | H04L 61/4511 370/252 |
| 2020/0162371 A1* | 5/2020 | Musku | H04L 45/54 |
| 2020/0241903 A1* | 7/2020 | Wang | H04L 41/12 |
| 2020/0341789 A1 | 10/2020 | Ghag et al. | |
| 2022/0045912 A1 | 2/2022 | Rao et al. | |

(Continued)

OTHER PUBLICATIONS

"WeaveWorks: Feature Overview", online: https://www.weave.works/docs/scope/latest/features/, accessed Jan. 31, 2023, 5 pages.

(Continued)

*Primary Examiner* — Padma Mundur
(74) *Attorney, Agent, or Firm* — BEHMKE INNOVATION GROUP LLC; James M. Behmke; James J. Wong

(57) ABSTRACT

In one embodiment, an illustrative method herein may comprise: determining, by a network controller, physical network topology of a data center network; collecting, by the network controller, virtual machine related network topology of the data center network from a virtual machine manager for the data center network; collecting, by the network controller, virtual ethernet flow mapping information of the data center network from a blade system management software for the data center network; collecting, by the network controller, container workload information of the data center network from a container orchestrator for the data center network; and generating, by the network controller, an integrated correlated visualization mapping of containers and associated network attachment points in the data center network based on the physical network topology, the virtual machine related network topology, the virtual ethernet flow mapping information, and the container workload information.

19 Claims, 13 Drawing Sheets

(56) References Cited

U.S. PATENT DOCUMENTS

2023/0186327 A1* 6/2023 Robinson ........... G06Q 30/0201
705/7.29

OTHER PUBLICATIONS

"Deploy and Access the Kubernetes Dashboard", online: https://kubernetes.io/docs/tasks/access-application-cluster/web-ui-dashboard/, Dec. 26, 2022, 5 pages.
Kim, et al., "SPECT8", online: https://github.com/spekt8/spekt8, Aug. 29, 2020, 4 pages.
"vCenter", online: https://www.vmware.com/products/vcenter.html, accessed Jan. 31, 2023, 7, VMware, Inc.
"Arista Container Tracer", online: https://www.arista.com/assets/data/pdf/DockerContainerTracerBulletin.pdf, Feb. 1, 2018, 3 pages, Arista Networks, Inc.

* cited by examiner

ENHANCING CONTAINER WORKLOAD VISIBILITY IN DATA CENTER ENVIRONMENTS WITH BLADE SWITCHES

TECHNICAL FIELD

The present disclosure relates generally to computer systems, and, more particularly, to enhancing visibility of container workload running on blade servers in data center environments with blade switches.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, with the increasing complexity of containerized deployments in data center environments with blade switches (e.g., integrated data center configurations), it is imperative that the network visibility with respect to containerized workloads as well as the traffic to/from these workloads is not lost in spite of the additional levels of indirection that this new data center architecture has brought up.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative method herein may comprise: determining, by a network controller, physical network topology of a data center network; collecting, by the network controller, virtual machine related network topology of the data center network from a virtual machine manager for the data center network; collecting, by the network controller, virtual ethernet flow mapping information of the data center network from a blade system management software for the data center network; collecting, by the network controller, container workload information of the data center network from a container orchestrator for the data center network; and generating, by the network controller, an integrated correlated visualization mapping of containers and associated network attachment points in the data center network based on the physical network topology, the virtual machine related network topology, the virtual ethernet flow mapping information, and the container workload information.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
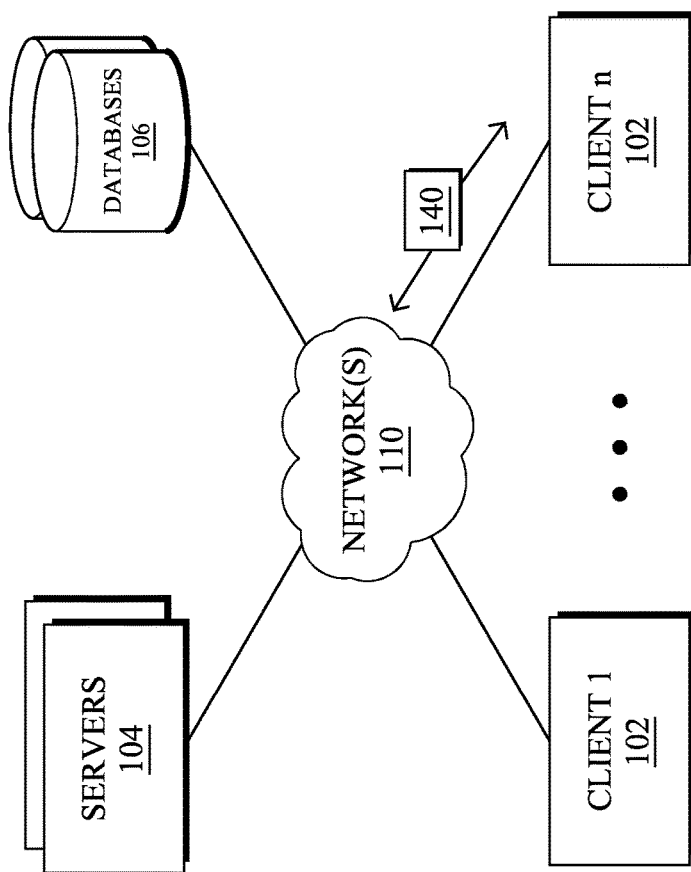
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
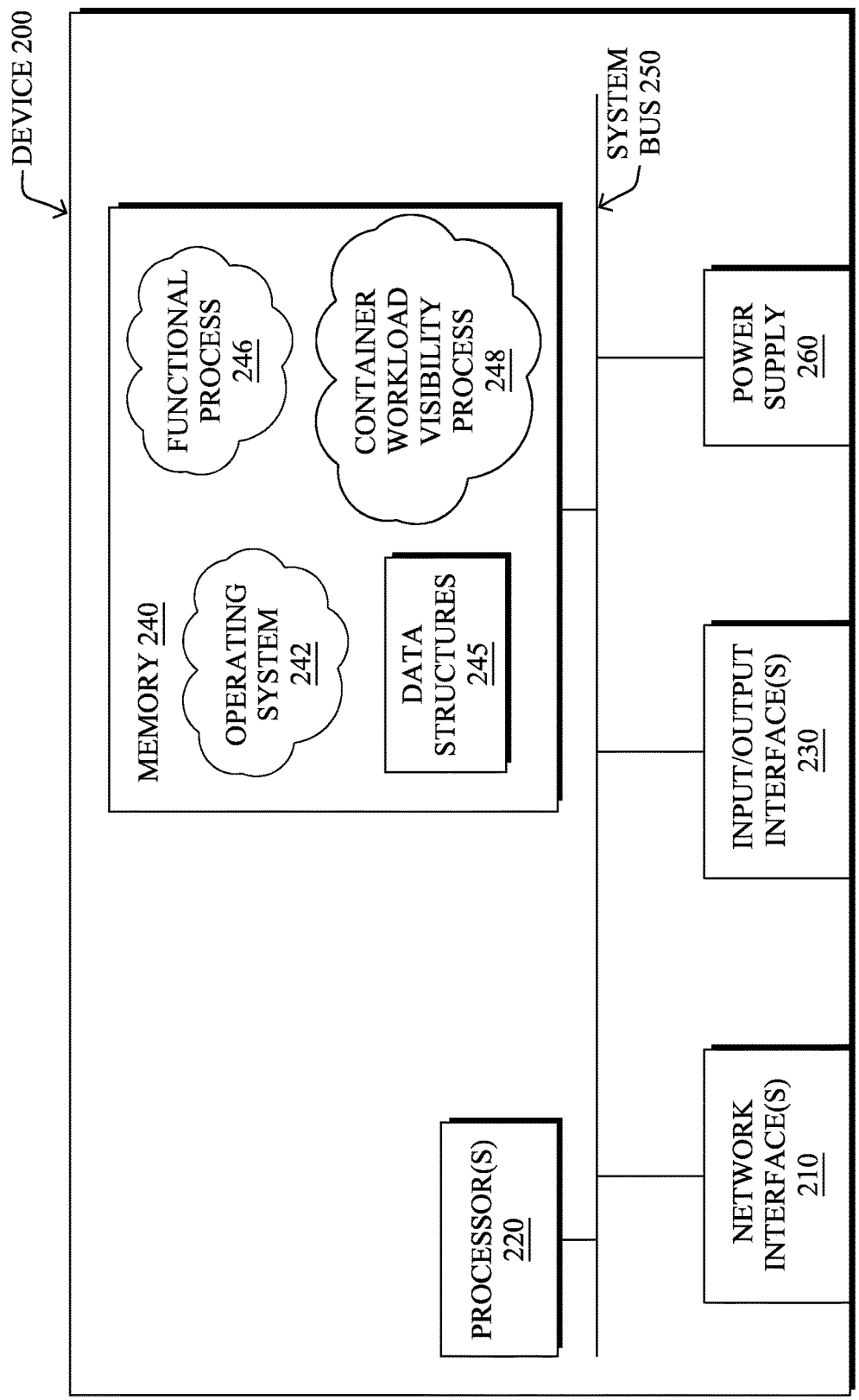
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "container workload visibility" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Container Workload Visibility for Blade Switch Environments

For instance, data centers are typically deployed in different sites that potentially span one or more geographical locations. Each site has one or more data halls. Each data hall has multiple rows of server racks, and each rack typically has N servers that in turn are connected to the rest of the physical network via a pair of Top-of-Rack (ToR) or leaf switches. The servers themselves could be rack mounts or blades. With the popularity of integrated data center configurations, such as the Unified Computing System (UCS) available from Cisco Systems, Inc. of San Jose, California, (a data center server computer product line composed of server hardware, virtualization support, switching fabric, and management software that provides scalability by integrating many components of a data center that can be managed as a single unit), servers may connect to a pair of blade switches (e.g., UCS Fabric Interconnect or "FI") that in turn connect to the ToRs. This provides a separation of domains between the compute and network administrators.

A typical data center deployment has a mixture of various kinds of application workloads running directly on bare-metal servers, or virtualized servers (virtual machines (VMs), containers). Any kind of troubleshooting typically begins with the location of the server(s) on which the workload resides followed by investigation of the compute, storage, and network resources that are servicing that workload. From a network point of view, this typically means that the ToR switch servicing the traffic to/from the workload is a good starting point. With containerized workloads gaining more and more popularity, the Kubernetes (K8s) containerized architecture has become a widely used system of orchestration for automating application deployment, scaling, and management using micro-services realized via one or more containers.

As noted above, with the increasing complexity of containerized deployments in data center environments with blade switches (e.g., integrated data center configurations), it is imperative that the network visibility with respect to workloads as well as the traffic to/from these workloads is not lost in spite of the additional levels of indirection that this new data center architecture has brought up.

Specifically, K8s itself may be deployed on bare-metal servers directly or on VMs. The VMs may run on an ESXi, Hyper-V, KVM or some other hypervisor, as will be understood by those skilled in the art. Also, as mentioned, the servers could be blades or rack mounts. From a monitoring and visibility point of view, what is available today is standalone monitoring of the K8s clusters. This includes monitoring of the K8s controller and K8s nodes, including the state of pods, namespaces, services, load balancers and associated entities. However, the visibility and monitoring of such systems currently provide no direct insights into the correlation of the containerized workloads to the physical network.

To give an idea of the potential different entities along the path in an ESXi environment with blades behind a typical blade switch attached to a ToR consider the following:

VM-based K8s cluster running on Blade server(s)—
K8s pod→VM(K8s node)→Blade Server (ESXi)→vswitch/DVS→
vmnic(ESXi uplink)→veth(on the IOM)→FI-A/FI-B (Blade switches)→
port-channel-uplink→ToR(vPC-pair)→Rest of the network.

Baremetal-based K8s cluster running on Blade servers—
K8s pod→Blade Server (ESXi)→vmnic(ESXi uplink)→
veth(on the IOM)→FI-A/FI-B (Blade switches)→
port-channel-uplink→ToR(vPC-pair)→Rest of the network.

Typically, using one of the many Container Network Interface (CNI) plugins available with Kubernetes (e.g., flannel, calico, weave, etc., as will be appreciated by those skilled in the art), the containerized workloads residing on the different compute nodes have the appropriate network connectivity. However, the insights provided by these tools are inadequate when it comes to debugging container networking specific issues (e.g., tracing a faulty inter-pod network link) within the context of data center. Specifically, as mentioned earlier, there is no correlation or visibility provided with regard to the physical network connectivity. Discovery protocols such as the Link Layer Discovery Protocol (LLDP) or others only provide a link-layer visibility at a one-hop level. But given the multi-level hierarchy that exists, more sophisticated mechanisms are required for enhanced visibility into containerized workloads.

The techniques herein, therefore, are directed to enhancing container workload visibility in data center environments with blade switches. For instance, network visibility of E-W or N-S traffic for these kind of workloads in this kind of environment can only be made possible with a correlation of information obtained from various entities, such as a network controller, Virtual Machine Manager (VMM), and container orchestrator (e.g., K8s controller). Unlike other available solutions that require a custom agent, the techniques herein achieve these insights without the need to run any sort of proprietary or other agent on the servers hosting the container workloads or on the network switches.

In particular, the techniques herein present a novel agent-less approach towards precise monitoring and visualization of containerized workloads in data center environments by providing an integrated correlated view of information gleaned from a network controller, the virtual machine manager, and the container orchestrator (e.g., K8s controller). The techniques herein also propose a framework where users can input names of appropriate client and server endpoints of interest, and then be presented with a network-topology map of the various paths that may be possible for this tuple.

Specifically, according to one or more embodiments described herein, a network controller, which determines physical network topology of a data center network, also collects:
 i) virtual machine related network topology of the data center network from a virtual machine manager for the data center network;
 ii) virtual ethernet flow mapping information of the data center network from a blade system management software for the data center network; and iii) container workload information of the data center network from a container orchestrator for the data center network.

The network control may then generate an integrated correlated visualization mapping of containers and associated network attachment points in the data center network based on the physical network topology, the virtual machine related network topology, the virtual ethernet flow mapping information, and the container workload information.

Operationally, the description herein assumes illustrative use of Kubernetes (K8s) as the container orchestrator, VMware vCenter as the virtual machine manager (VMM), and the Cisco Nexus Dashboard Fabric Controller (NDFC) as the network controller. However, the same mechanism will work for other container orchestrators and VMMs, as well as other network controllers. The VMware vCenter and K8s orchestrator may be onboarded on to the NDFC with read-only privileges. Appropriate plugins also known as microservices in NDFC call the vCenter and K8s APIs for directed information and may also subscribe to change notifications of interest. With vCenter, this information would be information about the vSwitch, uplinks, ESXi hosts, DVSes, port-groups, VLANs etc. With K8s, this information would be information about the compute nodes, pods, namespaces, containers, load balancers, associated IPs, etc. Using LLDP/CDP, NDFC would be aware of all entities that are directly attached to the ToR switches that are managed by the controller. Finally, with integration with the UCS Manager running on the UCS FI or blade-switch, additional network topology information will be available about the veth interfaces mapped to the blade server uplinks, the port-channels, the hashing algorithm, the pinning groups, etc.

Again, with K8s deployed in a virtualized blade server environment, the network controller can capture all the different pieces of information from the respective domain controllers mentioned above and draft up a granular visibility map of all the containers/pods running in this environment and their network attachment points.

Figure 3:
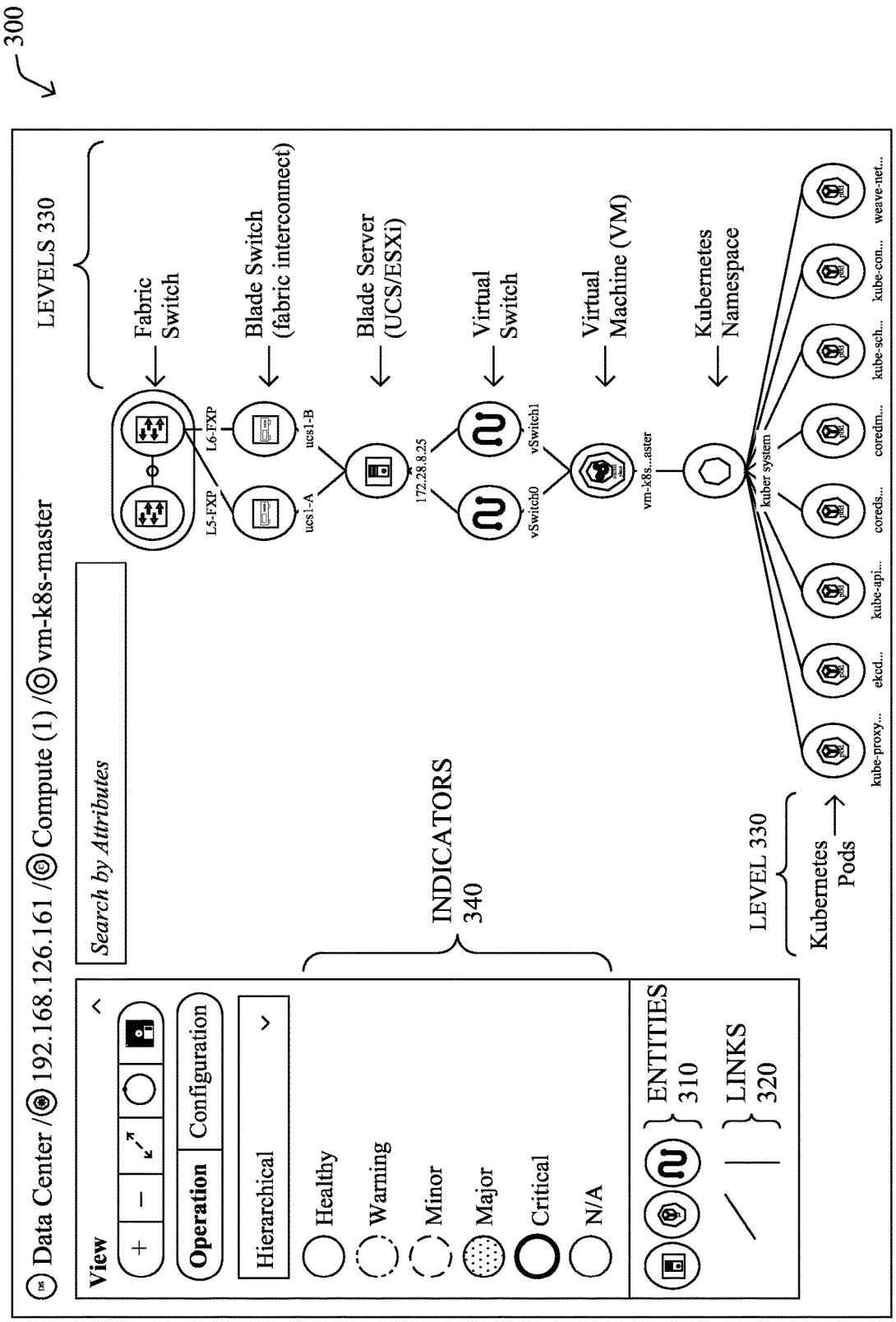
FIG. 3 illustrates an example integrated correlated visualization mapping of a data center environment generated according to a cluster node topology view generated in accordance with one or more embodiments described herein.

FIG. 3 illustrates an example integrated correlated visualization mapping 300 of a data center environment generated in accordance with one or more embodiments described herein. For instance, entities 310 (e.g., physical or virtual objects, processes, endpoints, etc.) are interconnected by links 320 across different "levels" 330. This view thus shows "what is on what" and "what is connected to what", as may be appreciated by those skilled in the art. As an illustration, the example levels in this particular view may comprise such things as, from top down: fabric switches, blade switches (fabric interconnect), blade server (UCS/ESXi), virtual switch, virtual machine (VM), Kubernetes namespace, and Kubernetes pods. Each entity 310 may have a corresponding icon for ease of interpretation, and each icon may be associated with a particular color or other indication of general "health" of the entity, such as, e.g., different indications 340 of "healthy", "warning", "minor", "major", "critical" or "N/A" (not applicable), or any other suitable categorical classification for the entities as so desired based on the information available.

As shown in FIG. 3, links 320 between entities 310 at the different levels 330 will show the appropriate context information. For example, the ToR/Switch to blade-switch will indicate the ethernet interfaces attached on each side including information about the port-channels if configured. The UCS-FI to the blade server will provide information about the veth on the IOM/network-adaptor to vmnic ESXI uplink mapping. The link between the virtual switch and k8s compute node VM will contain information about the port-group, associated VLANs and the Virtual NIC or vnic attached to that port-group. Also, the pods running on the K8s compute VM will be depicted along with their veth interface to IP mapping as well as association to the any load balancers that may be front-ending them. Moreover, depending on the plugin that is enabled on the K8s cluster, the techniques herein can optionally depict the internal bridges, OVSes/vswitches, bond interfaces etc. if a customer would like to get into the granular details of the K8s networking.

Note, too, that customers are typically interested in traffic going between two endpoints. In K8s terms, these may actually not represent individual entities but an external client running on a VM trying to access a service front-ended by a load balancer that in turn is served with a set of worker pod replicas. This is a typical example of a N-S flow with the client sitting outside trying to access a service hosted on the K8s cluster. The location of the client VM as well as the information about the K8s service is all available in the NDFC with appropriate correlation of information gathered from the network fabric, K8s orchestrator and the VMM. In addition to the locality, the information about the layer-3 routing contexts can also be gleaned at the network controller via reading the routing tables from the appropriate switches servicing the workloads as well as the routing tables on the K8s compute nodes. In this way, given the source (client VM) and destination (K8s service), information can be presented to the user in terms of the end-to-end routing path that the traffic can take. Note that this could be one of several paths depending on the ECMP hash algorithm on the network switch, the port-channel hashing algorithms along the various FI/ESXi points and the load balancer algorithm on the K8s side. The goal here is to give the user a view of what the potential paths the traffic would take so that they have a narrow starting point to start troubleshooting specific issues being reported. Everything begins with the workload location entry point to the physical network and then what are the potential paths that can be taken for a given source, destination tuple. The user does not need to provide IP addresses but instead can provide information about applications via DNS names. The NDFC in association with an appropriate DNS/IPAM service can translate this into appropriate IP addresses and then provide the above succinct map of possible options/paths that a network administrator may have to concentrate on.

According to one or more embodiments of the techniques herein, the network controller herein can initially provide a high-level topology view, where further details can be made available depending on what a user (or other interface) is interested in. For instance, FIGS. 4-11 present sample different scope views available to the embodiments herein (that is, various perspectives of network discovery and its topology captured at different scopes), though other views may be made in accordance with the techniques herein, and the views shown are merely representative examples not meant to limit the scope of the present disclosure, accordingly.

Figure 4:
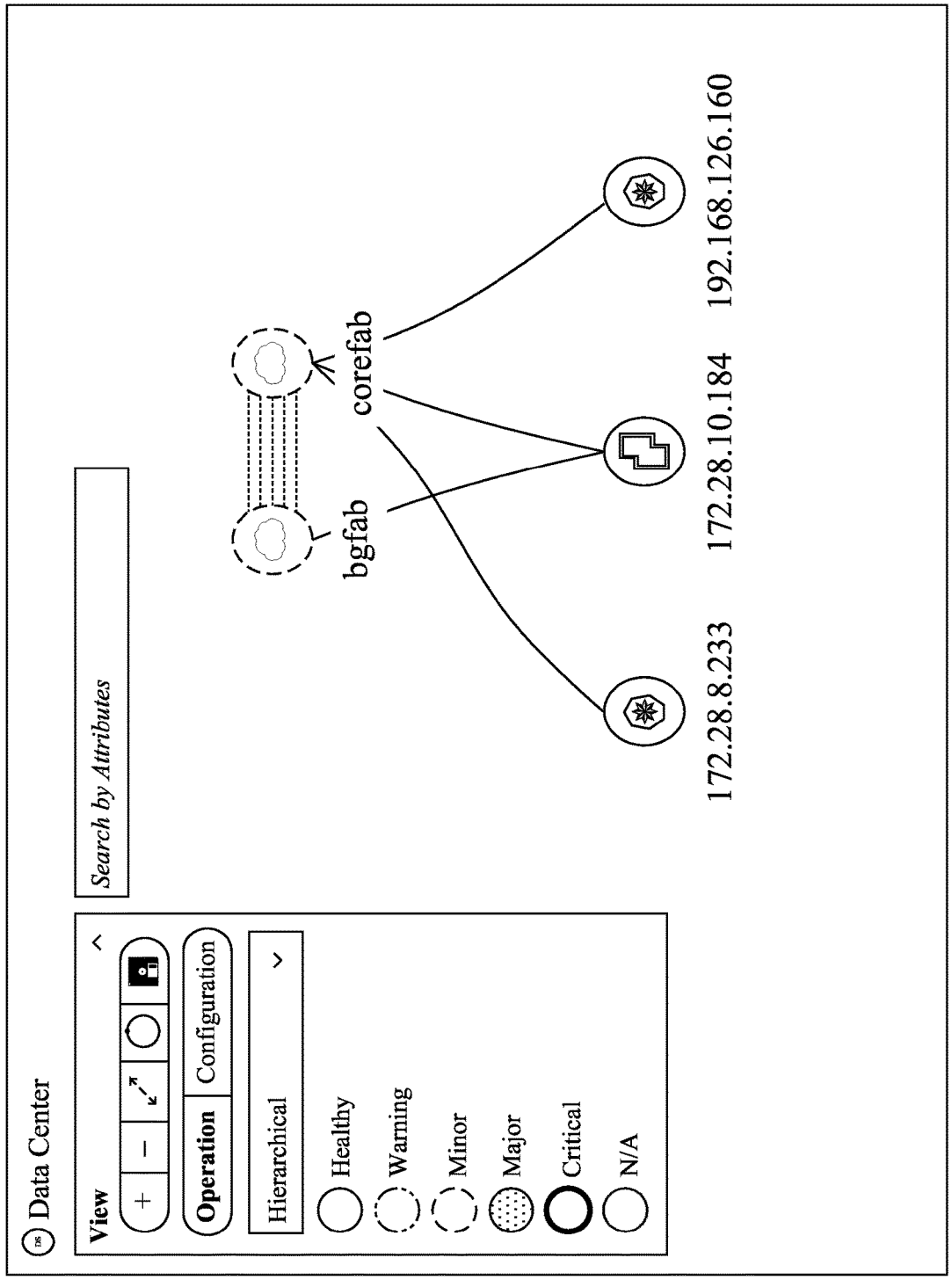
FIG. 4 illustrates an example integrated correlated visualization mapping of a data center environment according to a data center scope generated in accordance with one or more embodiments described herein.

FIG. 4 illustrates an example integrated correlated visualization mapping 400 of a data center environment according to a data center scope generated in accordance with one or more embodiments described herein, and as will be appreciated by those skilled in the art.

Figure 5:
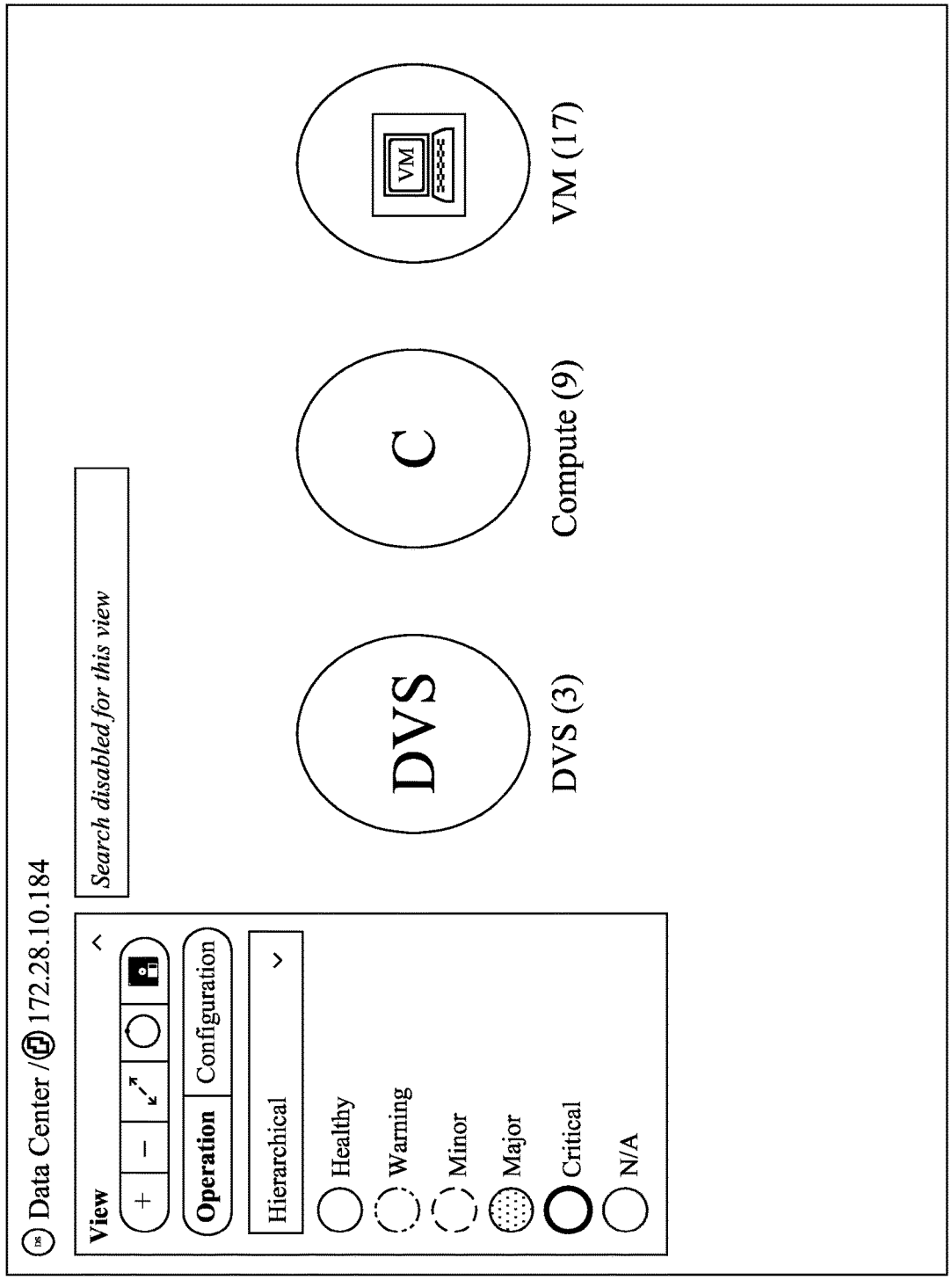
FIG. 5 illustrates an example integrated correlated visualization mapping of a data center environment according to a cluster scope generated in accordance with one or more embodiments described herein.

FIG. 5 illustrates an example integrated correlated visualization mapping 500 of a data center environment according to a cluster scope generated in accordance with one or more embodiments described herein, and as will be appreciated by those skilled in the art. Example clusters shown are DVSs, Compute, and VMs.

Figure 6A:
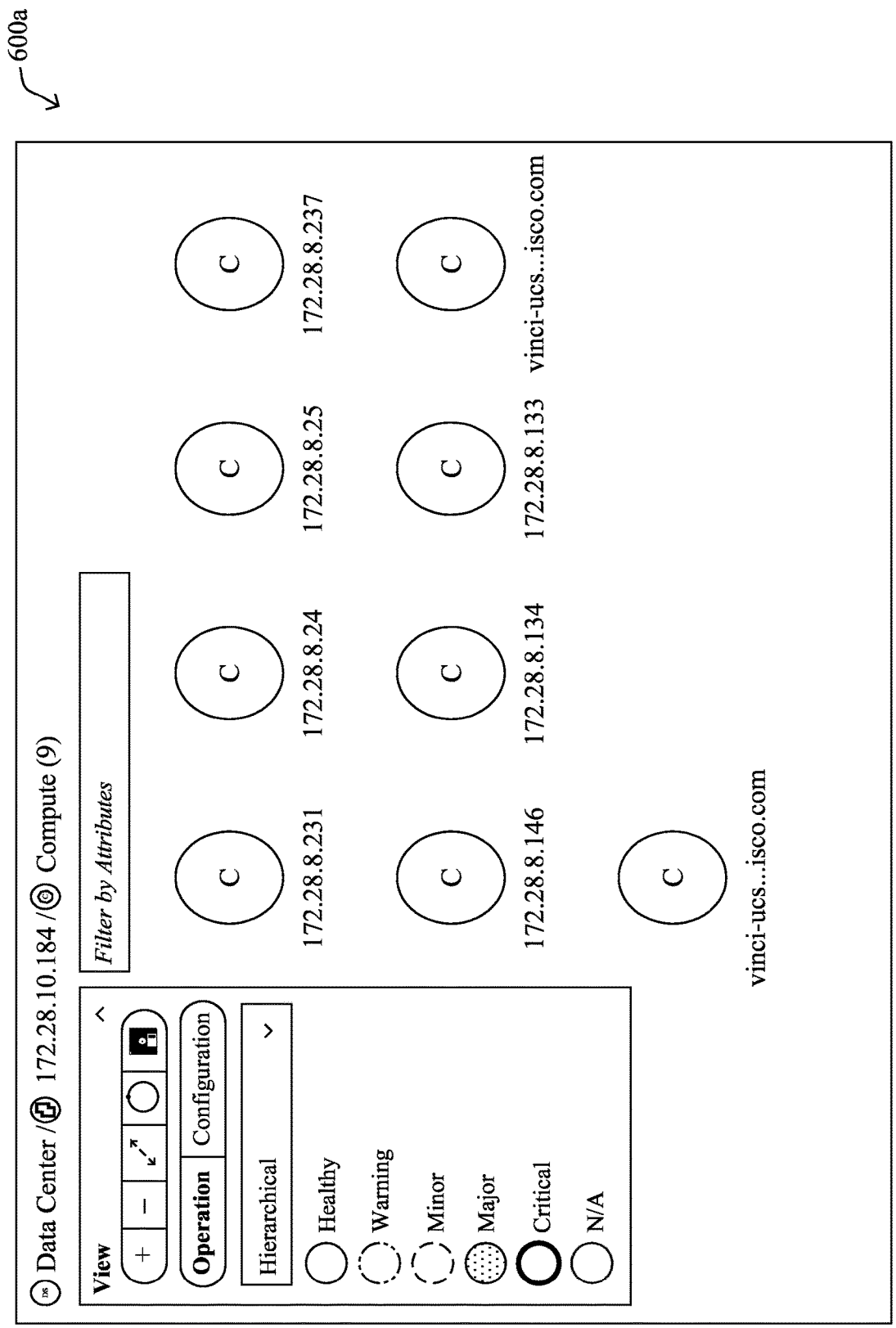
FIG. 6 (FIGS. 6A-6B) illustrates example integrated correlated visualization mappings of a data center environment according to a virtual resource scope generated in accordance with one or more embodiments described herein.
Figure 6B:
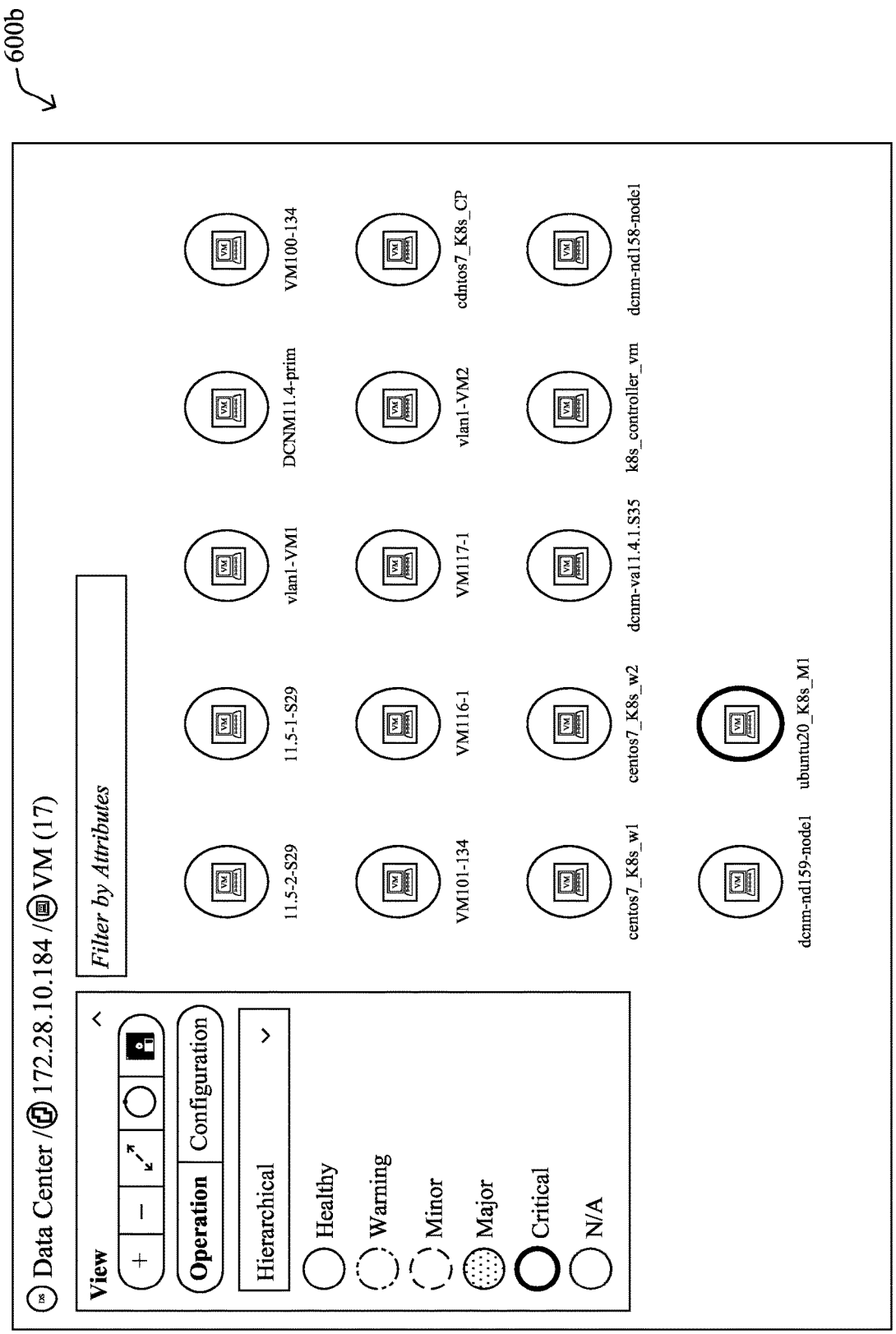

FIG. 6 (FIGS. 6A-6B) illustrates example integrated correlated visualization mappings 600a and 600b, respectively, of a data center environment according to a virtual resource scope (e.g., Compute/VMs) generated in accordance with one or more embodiments described herein, and as will be appreciated by those skilled in the art. For instance, mapping 600a is showing compute resources, while mapping 600b is showing VMs.

Figure 7:
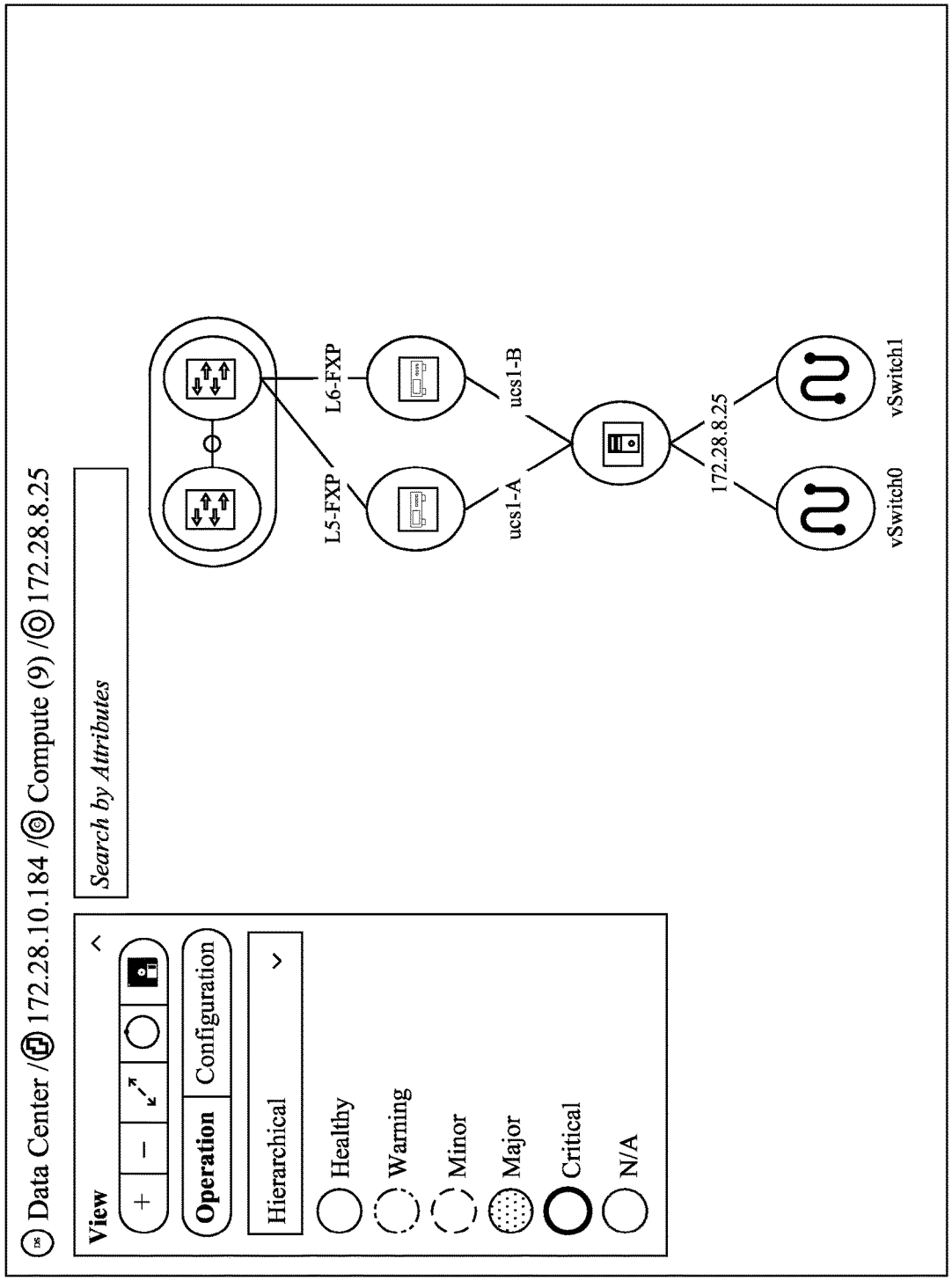
FIG. 7 illustrates an example integrated correlated visualization mapping of a data center environment according to a node scope generated in accordance with one or more embodiments described herein.

FIG. 7 illustrates an example integrated correlated visualization mapping 700 of a data center environment according to a node scope (e.g., Compute/VM) generated in accordance with one or more embodiments described herein, and as will be appreciated by those skilled in the art.

Figure 8:
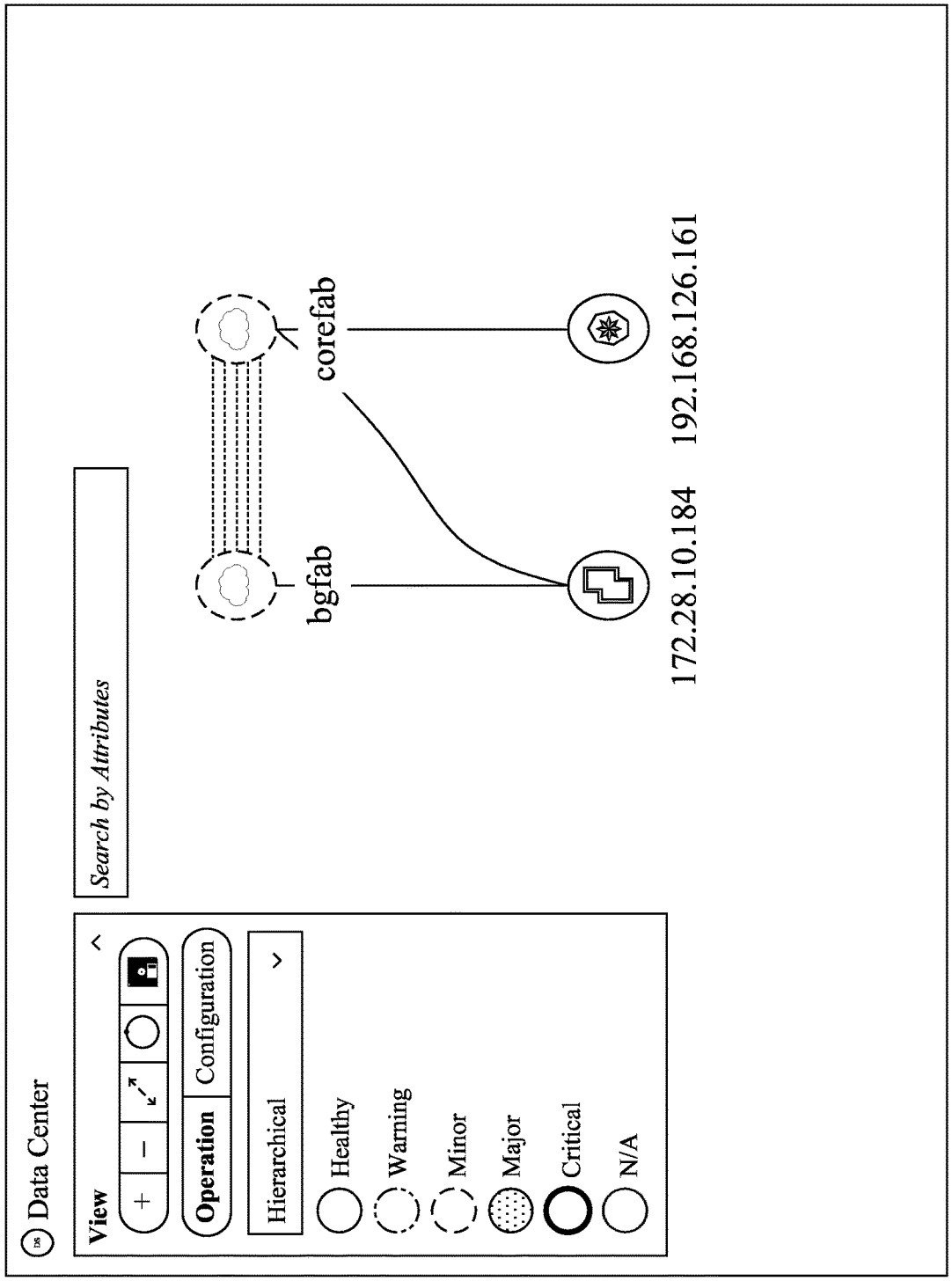
FIG. 8 illustrates an example integrated correlated visualization mapping of a data center environment according to a data center scope generated in accordance with one or more embodiments described herein.

FIG. 8 illustrates an example integrated correlated visualization mapping 800 of a data center environment according to a data center scope (e.g., including Kubernetes cluster) generated in accordance with one or more embodiments described herein, and as will be appreciated by those skilled in the art.

Figure 9:
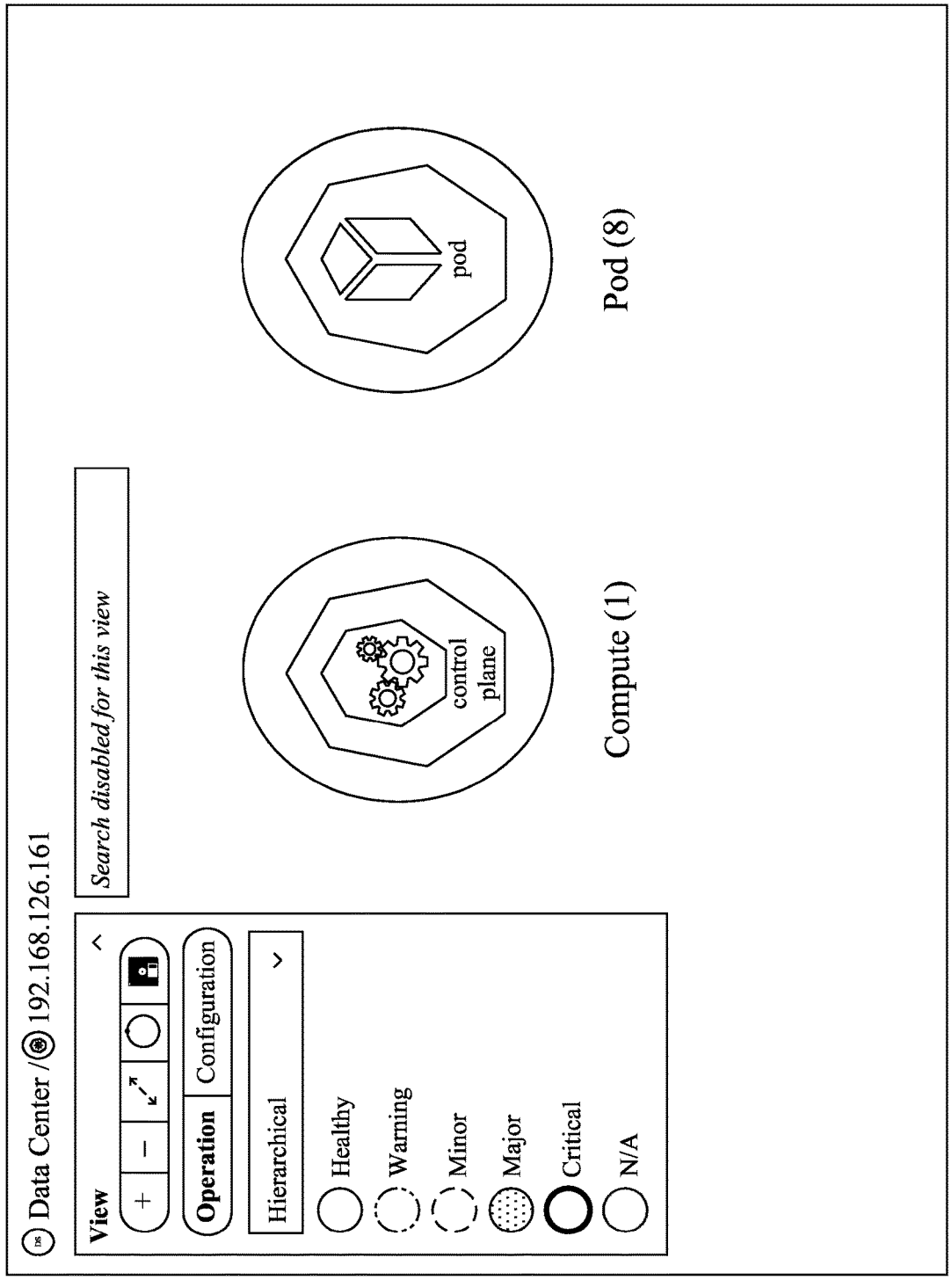
FIG. 9 illustrates an example integrated correlated visualization mapping of a data center environment according to a container cluster view generated in accordance with one or more embodiments described herein.

FIG. 9 illustrates an example integrated correlated visualization mapping 900 of a data center environment according to a container cluster view (e.g., Kubernetes cluster view) generated in accordance with one or more embodiments described herein, and as will be appreciated by those skilled in the art.

Figure 10:
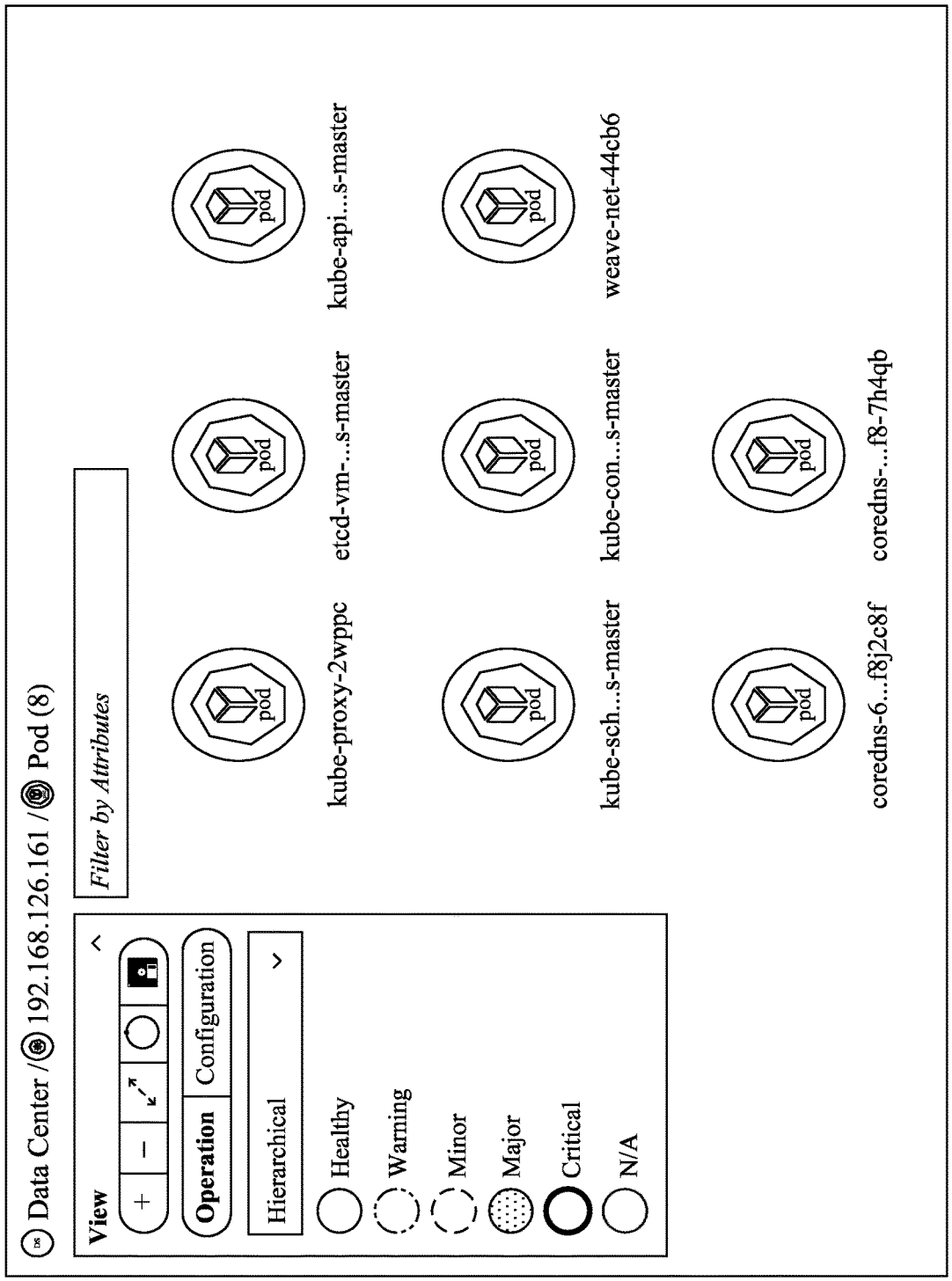
FIG. 10 illustrates an example integrated correlated visualization mapping of a data center environment according to a pod list view generated in accordance with one or more embodiments described herein.

FIG. 10 illustrates an example integrated correlated visualization mapping 1000 of a data center environment according to a pod list view generated in accordance with one or more embodiments described herein, and as will be appreciated by those skilled in the art.

Figure 11:
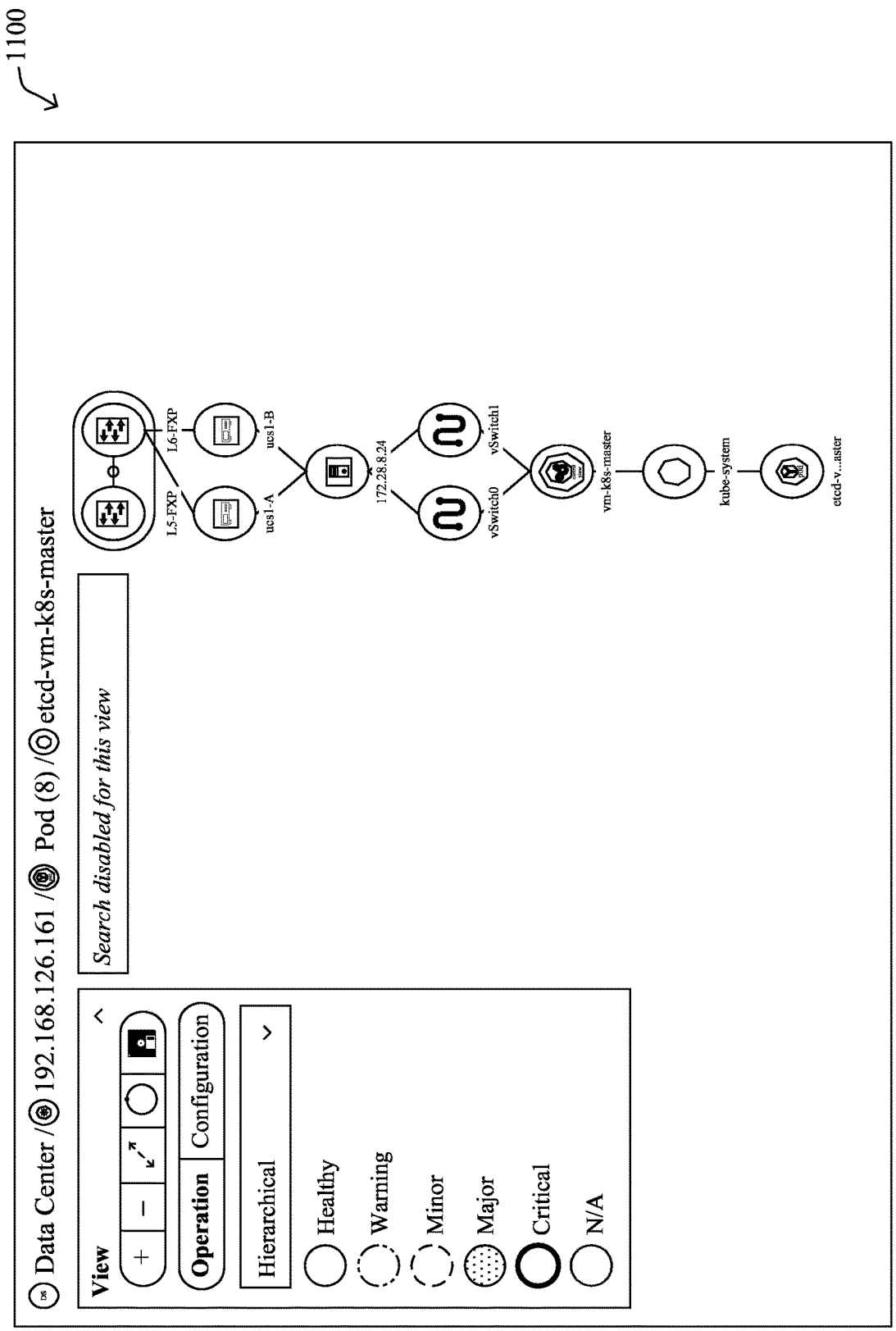
FIG. 11 illustrates an example integrated correlated visualization mapping of a data center environment according to a pod topology view generated in accordance with one or more embodiments described herein.

FIG. 11 illustrates an example integrated correlated visualization mapping 1100 of a data center environment according to a pod topology view generated in accordance with one or more embodiments described herein, and as will be appreciated by those skilled in the art.

Figure 12:
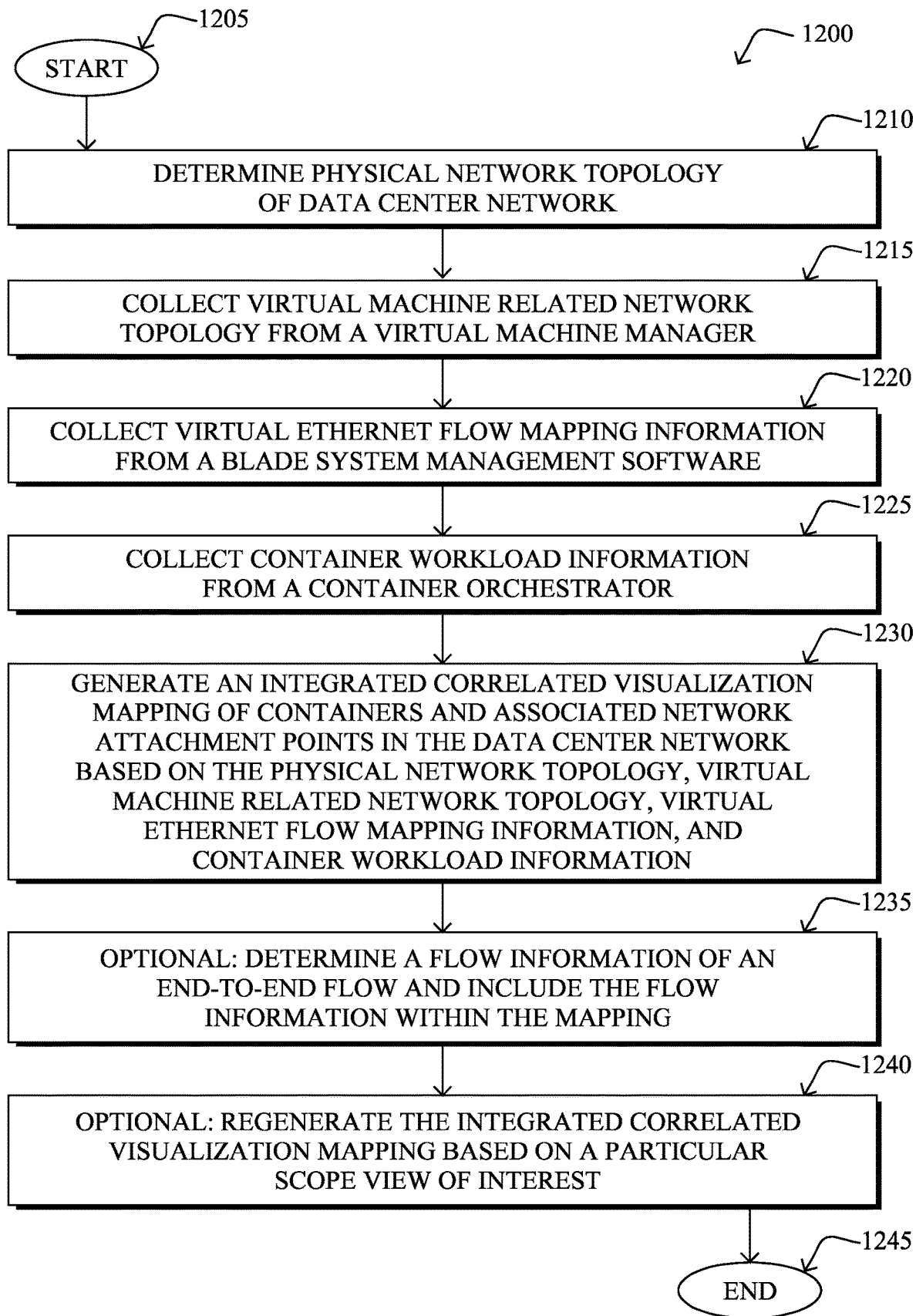
FIG. 12 illustrates an example simplified procedure for enhancing container workload visibility in data center environments with blade switches in accordance with one or more embodiments described herein.

In closing, FIG. 12 illustrates an example simplified procedure for enhancing container workload visibility in data center environments with blade switches in accordance with one or more embodiments described herein, particularly from the perspective of a network controller. For example, a non-generic, specifically configured device (e.g., device 200) may perform procedure 1200 by executing stored instructions (e.g., process 248, such as an observability process, visibility process, network controller process, and so on). The procedure 1200 may start at step 1205, and continues to step 1210, where, as described in greater detail above, a network controller determines physical network topology of a data center network (e.g., based on one or more discovery protocols to determine one or more entities attached to one or more Top-of-Rack switches managed by the network controller).

Steps 1215-1225 are then based on collecting information from other participating devices int the data center, such as by calling an API for directed information, subscribing for change notifications of information of interest, and so on. (Note that steps 1210-1225, in particular, can be performed in any order, and the order shown herein is merely one example representation not meant to limit the scope of the embodiments herein.)

Specifically, in step 1215, the network controller collects virtual machine related network topology of the data center network from a virtual machine manager for the data center network. For example, virtual machine related network topology may comprise such things as: virtual machines on identified servers; blade switch attachments; virtual switch information; virtual local area network information; neighbor information; uplink information; hypervisor host information; distributed virtual switch information; and port group information.

In step 1220, the network controller also collects virtual ethernet flow mapping information of the data center network from a blade system management software for the data center network. For instance, virtual ethernet flow mapping information may comprise, among other things: blade server uplink mappings to virtual ethernet interfaces; pinning groups; ingress and egress traffic flow information; port channel information; and hashing algorithm information.

Further, in step 1225, the network controller collects container workload information of the data center network from a container orchestrator for the data center network, such as, e.g., compute node information, pod information, construct information, namespace information, container information, load balancer information, node and blade switch neighbor information, IP address information, etc.

In step 1230, the network controller may now generate an integrated correlated visualization mapping of containers and associated network attachment points in the data center network based on the physical network topology, the virtual machine related network topology, the virtual ethernet flow mapping information, and the container workload information above. For example, as detailed above, the techniques herein may use identity mapping to correlate operative locations of entities and operative connections between the entities (e.g., a plurality of links between entities at a plurality of different functional levels, where the plurality of links are associated with respective contextual information).

Optionally, in step 1235, the techniques herein may also be used to determine a flow information of an end-to-end flow of the data center network and include the flow information within the integrated correlated visualization mapping. For instance, as described in greater detail above, the techniques herein may determine, based on input entered into a user interface, a source endpoint and a destination endpoint of the data center network in order to establish a network-topology map of potential paths for flows between the source endpoint and the destination endpoint. According to the embodiments described above, these potential paths may also show a plurality of paths based on things such as ECMP hash algorithm on network switches, port-channel hashing algorithms on bare metal hypervisors, load balancer algorithms along the plurality of paths, etc. Similarly, the techniques herein may do the same for applications via receiving DNS name entries from a user (and translating the DNS names into associated IP addresses for the endpoints above), and so on.

Also optionally, in step 1240, the techniques herein may take an initial high-level view of the integrated correlated visualization mapping, and may regenerate it based on a particular scope view of interest (e.g., data center scope, cluster scope, virtual resource scope, node scope, data center scope, container cluster view, pod list view, pod topology view, etc., such as those as described above).

The simplified procedure 1200 may then end in step 1245, notably with the ability to continue updating any of the information above and the corresponding mappings and/or scope views, accordingly. Other steps may also be included generally within procedure 1200. For example, such steps (or, more generally, such additions to steps already specifically illustrated above), may include: onboarding the virtual machine manager and container orchestrator onto the network controller with read-only privileges; and so on.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for enhancing container workload visibility in data center environments with blade switches. In particular, the techniques herein allow precise monitoring and insightful visualization of containerized workloads in data center environments without requiring a custom agent on the servers hosting the container workloads or on the network switches. That is, in a hybrid workload environment, the techniques herein map end-to-end paths from any workload to any workload, thus establishing a visual workload in the context of a data center (i.e., within data center fabric). Also, the techniques herein do not merely rely on APIs, as not all of the information required is available on APIs (e.g., running hypervisor software, and mapping veth interfaces, etc.), as will be appreciated by those skilled in the art.

Notably, current visualization products only work for standalone instances of Kubernetes, and they do not provide any details about the container workload distribution of the K8s cluster deployed on the underlying physical data center fabric comprising the switches that actually provide connectivity to the compute servers. Still other products may effectively talk to the container orchestrators and use LLDP information for direct K8s server connectivity to determine what containerized workloads are running below a given switch, but such techniques are switch-local features and fairly limited in scope, specifically being inoperative in blade-switch environments.

Illustratively, the techniques described herein may be performed by hardware, software, and/or firmware, such as in accordance with the illustrative container workload visibility process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: determining, by a network controller, physical network topology of a data center network; collecting, by the network controller, virtual machine related network topology of the data center network from a virtual machine manager for the data center network; collecting, by the network controller, virtual ethernet flow mapping information of the data center network from a blade system management software for the data center network; collecting, by the network controller, container workload information of the data center network from a container orchestrator for the data center network; and generating, by the network controller, an integrated correlated visualization mapping of containers and associated network attachment points in the data center network based on the physical network topology, the virtual machine related network topology, the virtual ethernet flow mapping information, and the container workload information.

In one embodiment, virtual machine related network topology is selected from a group consisting of: virtual machines on identified servers; blade switch attachments; virtual switch information; virtual local area network information; neighbor information; uplink information; hypervisor host information; distributed virtual switch information; and port group information.

In one embodiment, virtual ethernet flow mapping information is selected from a group consisting of: blade server uplink mappings to virtual ethernet interfaces; pinning groups; ingress and egress traffic flow information; port channel information; and hashing algorithm information.

In one embodiment, container workload information is selected from a group consisting of: compute node information; pod information; construct information; namespace information; container information; load balancer information; node and blade switch neighbor information; and IP address information.

In one embodiment, determining physical network topology is based on one or more discovery protocols to determine one or more entities attached to one or more Top-of-Rack switches managed by the network controller.

In one embodiment, generating the integrated correlated visualization mapping of containers and associated network attachment points in the data center network is based on identity mapping of components of the physical network topology, the virtual machine related network topology, the virtual ethernet flow mapping information, and the container workload information to correlate operative locations of entities and operative connections between the entities.

In one embodiment, the data center network comprises a plurality of blade switches.

In one embodiment, the integrated correlated visualization mapping comprises a plurality of links between entities at a plurality of different functional levels, and wherein the plurality of links are associated with respective contextual information. In one embodiment, the respective contextual information is selected from a group consisting of: Top-of-Rack to blade-switch links indicative of ethernet interface attachments and configured port-channels; fabric interconnect to blade server links indicative of virtual ethernet interfaces on a physical network adaptor to a virtual network interface uplink mapping; virtual switch to containerized compute node virtual machine links indicative of a port-group, associated virtual local area networks, and virtual network interface attached to that port-group; pods executing on containerized compute node virtual machines depicted with respective virtual ethernet interface-to-IP mapping and any associated front-ending load balancers; and containerized cluster information indicative of one or more of internal bridges, virtual switches, and bond interfaces.

In one embodiment, the method further comprises: determining a flow information of an end-to-end flow of the data center network; wherein generating the integrated correlated visualization mapping further comprises including the flow information within the integrated correlated visualization mapping.

In one embodiment, the method further comprises: determining, based on input entered into a user interface, a source endpoint and a destination endpoint of the data center network; wherein generating the integrated correlated visualization mapping is further based on the source endpoint and the destination endpoint and establishes a network-topology map of one or more potential paths for flows between the source endpoint and the destination endpoint. In one embodiment, the one or more potential paths comprise a plurality of paths based on one or more of: an equal cost multi-path hash algorithm on network switches, port-channel hashing algorithms on bare metal hypervisors, and load balancer algorithms along the plurality of paths.

In one embodiment, the method further comprises: determining, based on input entered into a user interface, one or more applications via domain name server names; and translating the domain name server names into one or more associated IP addresses for the one or more applications; wherein generating the integrated correlated visualization mapping is further based on the one or more associated IP addresses for the one or more applications and establishes a network-topology map of one or more potential paths for flows of the one or more applications.

In one embodiment, the method further comprises: onboarding the virtual machine manager and container orchestrator onto the network controller with read-only privileges.

In one embodiment, collecting is based on one or both of calling an application programming interface for directed information and subscribing for change notifications of information of interest.

In one embodiment, the integrated correlated visualization mapping initially comprises a high-level topology view, and the method further comprises: determining, based on input entered into a user interface, a particular scope view of interest; and regenerating the integrated correlated visualization mapping based on the particular scope view of interest. In one embodiment, the particular scope view of interest is selected from a group consisting of: data center scope; cluster scope; virtual resource scope; node scope; data center scope; container cluster view; pod list view; and pod topology view.

According to the embodiments herein, an illustrative tangible, non-transitory, computer-readable medium herein may have computer-executable instructions stored thereon that, when executed by a processor on a network controller, cause the network controller to perform a method comprising: determining physical network topology of a data center network; collecting virtual machine related network topology of the data center network from a virtual machine manager for the data center network; collecting virtual ethernet flow mapping information of the data center network from a blade system management software for the data center network; collecting container workload information of the data center network from a container orchestrator for the data center network; and generating an integrated correlated visualization mapping of containers and associated network attachment points in the data center network based on the physical network topology, the virtual machine related network topology, the virtual ethernet flow mapping information, and the container workload information.

Further, according to the embodiments herein an illustrative apparatus herein may comprise: one or more network interfaces to communicate with a network; a processor coupled to the one or more network interfaces and configured to execute one or more processes; and a memory configured to store a network controller process that is executable by the processor, the network controller process, when executed, configured to: determine physical network topology of a data center network; collect virtual machine related network topology of the data center network from a virtual machine manager for the data center network; collect virtual ethernet flow mapping information of the data center network from a blade system management software for the data center network; collect container workload information of the data center network from a container orchestrator for the data center network; and generate an integrated correlated visualization mapping of containers and associated network attachment points in the data center network based on the physical network topology, the virtual machine related network topology, the virtual ethernet flow mapping information, and the container workload information.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
determining, by a network controller, physical network topology of a data center network;
onboarding, by the network controller, a virtual machine manager for the data center network and a container orchestrator for the data center network onto the network controller with read-only privileges;
collecting, by the network controller, virtual machine related network topology of the data center network from the virtual machine manager for the data center network;
collecting, by the network controller, virtual ethernet flow mapping information of the data center network from a blade system management software for the data center network;
collecting, by the network controller, container workload information of the data center network from the container orchestrator for the data center network; and
generating, by the network controller, an integrated correlated visualization mapping of containers and associated network attachment points in the data center network based on the physical network topology, the virtual machine related network topology, the virtual ethernet flow mapping information, and the container workload information.

2. The method as in claim 1, wherein virtual machine related network topology is selected from a group consisting of: virtual machines on identified servers; blade switch attachments; virtual switch information; virtual local area network information; neighbor information; uplink information; hypervisor host information; distributed virtual switch information; and port group information.

3. The method as in claim 1, wherein virtual ethernet flow mapping information is selected from a group consisting of: blade server uplink mappings to virtual ethernet interfaces; pinning groups; ingress and egress traffic flow information; port channel information; and hashing algorithm information.

4. The method as in claim 1, wherein container workload information is selected from a group consisting of: compute node information; pod information; construct information; namespace information; container information; load balancer information; node and blade switch neighbor information; and IP address information.

5. The method as in claim 1, wherein determining physical network topology is based on one or more discovery protocols to determine one or more entities attached to one or more Top-of-Rack switches managed by the network controller.

6. The method as in claim 1, wherein generating the integrated correlated visualization mapping of containers and associated network attachment points in the data center network is based on identity mapping of components of the physical network topology, the virtual machine related network topology, the virtual ethernet flow mapping information, and the container workload information to correlate operative locations of entities and operative connections between the entities.

7. The method as in claim 1, wherein the data center network comprises a plurality of blade switches.

8. The method as in claim 1, wherein the integrated correlated visualization mapping comprises a plurality of links between entities at a plurality of different functional levels, and wherein the plurality of links are associated with respective contextual information.

9. The method as in claim 8, wherein the respective contextual information is selected from a group consisting of: Top-of-Rack to blade-switch links indicative of ethernet interface attachments and configured port-channels; fabric interconnect to blade server links indicative of virtual ethernet interfaces on a physical network adaptor to a virtual network interface uplink mapping; virtual switch to containerized compute node virtual machine links indicative of a port-group, associated virtual local area networks, and virtual network interface attached to that port-group; pods executing on containerized compute node virtual machines depicted with respective virtual ethernet interface-to-IP mapping and any associated front-ending load balancers; and containerized cluster information indicative of one or more of internal bridges, virtual switches, and bond interfaces.

10. The method as in claim 1, further comprising:
determining a flow information of an end-to-end flow of the data center network;
wherein generating the integrated correlated visualization mapping further comprises including the flow information within the integrated correlated visualization mapping.

11. The method as in claim 1, further comprising:
determining, based on input entered into a user interface, a source endpoint and a destination endpoint of the data center network;
wherein generating the integrated correlated visualization mapping is further based on the source endpoint and the destination endpoint and establishes a network-topology map of one or more potential paths for flows between the source endpoint and the destination endpoint.

12. The method as in claim 11, wherein the one or more potential paths comprise a plurality of paths based on one or more of: an equal cost multi-path hash algorithm on network switches, port-channel hashing algorithms on bare metal hypervisors, and load balancer algorithms along the plurality of paths.

13. The method as in claim 1, further comprising:
determining, based on input entered into a user interface, one or more applications via domain name server names; and
translating the domain name server names into one or more associated IP addresses for the one or more applications;
wherein generating the integrated correlated visualization mapping is further based on the one or more associated IP addresses for the one or more applications and establishes a network-topology map of one or more potential paths for flows of the one or more applications.

14. The method as in claim 1, wherein collecting is based on one or both of calling an application programming interface for directed information and subscribing for change notifications of information of interest.

15. The method as in claim 1, wherein the integrated correlated visualization mapping initially comprises a high-level topology view, the method further comprising:
determining, based on input entered into a user interface, a particular scope view of interest; and
regenerating the integrated correlated visualization mapping based on the particular scope view of interest.

16. The method as in claim 15, wherein the particular scope view of interest is selected from a group consisting of: data center scope; cluster scope; virtual resource scope; node scope; data center scope; container cluster view; pod list view; and pod topology view.

17. A tangible, non-transitory, computer-readable medium having computer-executable instructions stored thereon that, when executed by a processor on a network controller, cause the network controller to perform a method comprising:
determining physical network topology of a data center network;
onboarding a virtual machine manager for the data center network and a container orchestrator for the data center network onto the network controller with read-only privileges;
collecting virtual machine related network topology of the data center network from the virtual machine manager for the data center network;
collecting virtual ethernet flow mapping information of the data center network from a blade system management software for the data center network;
collecting container workload information of the data center network from the container orchestrator for the data center network; and
generating an integrated correlated visualization mapping of containers and associated network attachment points in the data center network based on the physical network topology, the virtual machine related network topology, the virtual ethernet flow mapping information, and the container workload information.

18. The tangible, non-transitory, computer-readable medium as in claim 17, wherein the method further comprises:
determining, based on input entered into a user interface, a source endpoint and a destination endpoint of the data center network;
wherein generating the integrated correlated visualization mapping is further based on the source endpoint and the destination endpoint and establishes a network-topology map of one or more potential paths for flows between the source endpoint and the destination endpoint.

19. An apparatus, comprising:
one or more network interfaces to communicate with a network;
a processor coupled to the one or more network interfaces and configured to execute one or more processes; and
a memory configured to store a network controller process that is executable by the processor, the network controller process, when executed, configured to:
determine physical network topology of a data center network;
onboard a virtual machine manager for the data center network and a container orchestrator for the data center network onto the network controller process with read-only privileges;
collect virtual machine related network topology of the data center network from the virtual machine manager for the data center network;
collect virtual ethernet flow mapping information of the data center network from a blade system management software for the data center network;
collect container workload information of the data center network from the container orchestrator for the data center network; and
generate an integrated correlated visualization mapping of containers and associated network attachment points in the data center network based on the physical network topology, the virtual machine related network topology, the virtual ethernet flow mapping information, and the container workload information.

\* \* \* \* \*